July 29, 1952        T. R. SPECHT        2,605,302
DIRECT CURRENT MEASURING APPARATUS
Filed March 11, 1950
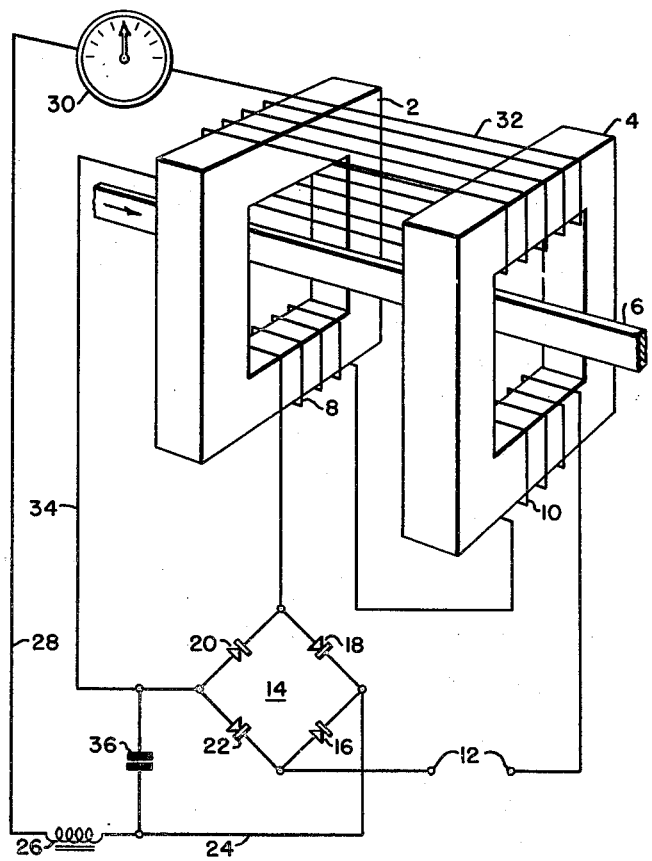
WITNESSES:
INVENTOR
Theodore R. Specht.
BY
James R. Ely
ATTORNEY Patented July 29, 1952

2,605,302

UNITED STATES PATENT OFFICE 2,605,302

DIRECT CURRENT MEASURING APPARATUS

Theodore R. Specht, Sharon, Pa., assignor to Westinghouse Electric Corporation, East Pittsburgh, Pa., a corporation of Pennsylvania Application March 11, 1950, Serial No. 149,071

4 Claims. (Cl. 171—95)

This invention relates to electromagnetic induction apparatus and, more specifically, to electromagnetic induction apparatus for measuring direct current.

Such apparatus ordinarily comprises a pair of magnetic cores disposed to be threaded by a direct-current carrying conductor bar, each core being provided with an alternating current winding, the two alternating current windings being so connected that the flux resulting from the flow of alternating current passes in opposite directions around the bar in the two cores. The direct-current bar is adapted to carry the direct current to be measured and is utilized as a primary winding while the alternating-current windings are employed as secondary windings. An alternating-current source and a current metering device are included in the secondary circuit. Since the secondary alternating current is proportionately related to the primary direct current as is well known to those skilled in the art, the metering device is calibrated to directly indicate the primary direct current.

Heretofore, when such apparatus has been utilized to effect the measurement of extremely high values of direct current, it has been found that difficulties are encountered therewith. If the primary direct current be increased, the secondary alternating current is proportionally increased and requires that conductors of a larger cross-sectional area be provided in the secondary circuit to assure safe operation of the apparatus. Such enlargement of the physical dimensions of the secondary conductors operates to increase the air-leakage reactance of the secondary windings and, in order to compensate for such increase to maintain the accuracy of the apparatus, the alternating-current voltage supply must be increased. This operation not only necessitates a further increase in the size of the secondary conductors but also requires that the dimensions of the magnetic cores be increased considerably. If direct currents exceeding about five thousand amperes are to be accurately measured by means of the above-described apparatus, the operating parts thereof must necessarily be very large and cumbersome contributing to a quite impractical design of the apparatus and the amount of alternating current power increases in about the same ratio as the size of the apparatus so that unreasonable amounts of power are required.

An object of the invention is to provide apparatus for measuring direct currents.

Another object of the invention is to provide electromagnetic induction apparatus for measuring extremely high values of direct currents, the operating elements of the apparatus being of relatively simple design.

A further object of the invention is to provide electromagnetic induction apparatus for measuring extremely high values of direct currents, the apparatus including means disposed for limiting the secondary alternating current to values which contribute to a relatively simple design of the apparatus and including means disposed for permitting the measurement of extremely high values of direct currents without danger to operating personnel.

Other objects of the invention will become apparent from the following description of the apparatus and the operation thereof when taken in conjunction with the accompanying drawing in which is shown a view partly in perspective and partly diagrammatic of apparatus and operating circuits illustrating an embodiment of this invention.

Referring to the drawing, a pair of closed core members 2 and 4 are illustrated as being disposed in side-by-side relation to be spaced apart a predetermined distance. The cores 2 and 4 are formed of built-up laminations of magnetic material, such as a relatively permeable alloy of iron, and may be of any desired shape. A direct-current winding 6 is disposed in inductive relation to the cores 2 and 4 to carry the direct current to be measured. The winding 6 is included in the primary circuit of the apparatus and may either be wound about the cores 2 and 4 or in the form of a single bar passing through and linking the closed cores 2 and 4 as shown in the drawing. It is preferable that the winding 6 be in the form of a conductor bar as illustrated since it must be adapted to carry extremely high values of direct currents.

In order that the apparatus be responsive to various values of direct currents flowing in the bar 6, a pair of alternating-current windings 8 and 10 are reversely wound, that is, disposed in opposed relation on the cores 2 and 4, respectively, for developing opposed flux in the pair of cores to have opposite magnetizing effects thereon. The reversely-wound arrangement of the windings 8 and 10 on the cores 2 and 4, respectively, operates to permit the secondary circuit to be responsive to variations in the direct current flowing in the bar 6 whereby the extremely high values of direct currents to be measured are effectively "transformed" into alternating currents of much smaller values which may be measured directly. The alternating-current secondary circuit extends from an alternating-current source 12, through a rectifying bank 14, the purpose of which will be described hereinafter, and the windings 8 and 10 back to the source 12.

In order to supply direct current for effecting the reduction of the magnetization of the cores 2 and 4, the full-wave bridge rectifier bank 14 comprising a plurality of unidirectional elements 16, 18, 20 and 22 is provided in the secondary circuit. The bank 14 is illustrated as being a copper-oxide-disc rectifier, although it may be of any suitable type. The elements 16 and 18 are disposed in opposing relation to provide a continuous supply of direct current, the element 16 passing one half-cycle of alternating current during each full cycle and the element 18 passing the other half-cycle during the same full cycle. The output of the rectifier bank 14 is supplied to a control circuit extending from the bank 14 through a conductor 24, an inductance element 26, a conductor 28, a metering device 30, a winding 32 and a conductor 34 back to the bank 14. The unidirectional elements 16 and 18 are disposed to supply direct current to the control circuit through conductor 24, whereas the elements 20 and 22 are disposed to prohibit the supply of direct current to the control circuit through conductor 34 for preventing a current bucking effect in the control circuit. A capacitor 36 is disposed in the control circuit across the conductors 24 and 34 to cooperate with the inductance element 26 to form a filter network for effecting the filtering of the pulsating direct-current supply from the rectifier bank 14.

In order to reduce the magnetization of the cores 2 and 4 for effecting the reduction of the alternating current flowing in the secondary circuit, the winding 32 is disposed in the control circuit to be wound about the cores 2 and 4 for conducting direct current in a direction to affect the magnetization of the cores 2 and 4 in a sense opposing the sense of magnetization thereof effected by the direct current in the bar 6. The opposing magnetizing currents operate to magnetize the cores 2 and 4 an amount which permits small values of alternating currents to flow in the secondary circuit. It is apparent that such relatively small values of secondary currents may be safely conducted by means of conductors of conventional size whereby the simple design of the apparatus is not destroyed.

In order to effect the measurement of the direct current flowing in the bar 6, a direct-current ammeter or other current-responsive measuring instrument 30 is provided in the control circuit as shown. The instrument 30 indicates the amount of direct-current flowing in the control circuit, and since such current is proportionately related to the direct current flowing in the bar 6, the measurement of the current in the bar 6 may be effected by means of the instrument 30 upon a suitable calibration thereof. It is apparent, however, that the current in the bar 6 may also be measured by means of a correctly calibrated alternating current measuring instrument disposed in the secondary circuit.

The invention as described possesses many advantageous features.

Extremely high values of direct current may be measured by means of the apparatus without the sacrificing of the relatively simple design thereof. The operation is made possible by means of the winding 32 which is disposed to effect the reduction of the amount of magnetization of the cores 2 and 4 for decreasing the alternating current in the secondary circuit a proportionate amount to thereby permit the utilization of secondary conductors having conventional physical dimensions.

The control circuit in which the instrument 30 is preferably disposed is at a relatively low potential to ground thereby decreasing the danger to operating personnel.

The secondary alternating current is relatively insensitive to variations in the alternating-current voltage supply and, hence, the effect of the instrument leads on the accuracy of the measurement is negligible whereby the remote metering of the current in the bar 6 may be effected without the difficulty of performing a special calibration of the instrument 30.

I claim as my invention:

1. An induction system for measuring direct current comprising in combination, a pair of magnetizable core members, direct current-conducting means for the flow of current which is to be measured, the direct current-conducting means being disposed in inductive relation to the core members for affecting the magnetization of the core members, a pair of alternating current windings disposed in reversely-wound relation on the respective core members to be energized by alternating current, another winding disposed in inductive relation to the core members to be energized for effecting the reduction of the magnetization of the core members, and current measuring means connected in circuit with said another winding adapted to provide a measurement of the direct current flowing in the direct current-conducting means.

2. An induction system for measuring direct current comprising in combination, a pair of magnetizable core members, a direct current-conducting bar for the flow of current which is to be measured, the conducting bar being disposed in inductive relation to the core members for affecting the magnetization of the core members, a pair of alternating current windings disposed in reversely-wound relation on the respective core members to be energized by alternating current, the energization of the alternating current windings on the core members being controlled in response to the energization of the current-conducting bar, means disposed for rectifying the alternating current, a control circuit including a winding inductively disposed on the core members in opposition to the inductive effect of conducting bar, the control circuit being disposed to be energized by direct current supplied by the rectifying means to thereby effect a reduction of the magnetization of the core members, and current measuring means disposed in the control circuit for providing a measuring of the direct current flowing in the current-conducting bar.

3. An induction system for measuring direct current comprising in combination, a pair of magnetizable core members, a direct current-conducting bar for the flow of current which is to be measured, the conducting bar being disposed in inductive relation to the core members for affecting the magnetization of the core members, a pair of alternating current windings disposed in reversely-wound relation on the respective core members to be energized by alternating current, the energization of the alternating current windings on the core members being controlled in response to the energization of the current-conducting bar, means disposed for rectifying the alternating current, a control circuit disposed to be supplied by the rectifying means, the control circuit including a winding disposed in inductive relation to the core members for affecting the magnetization of the core members in a sense opposing the sense of magnetization thereof effected by means of the current flow in the conducting bar to thereby reduce the magnetization of the core members, and means disposed in the control circuit for providing a measurement of the direct current flowing in the conducting bar.

4. An induction system for measuring direct current comprising in combination, a pair of magnetizable core members, a primary circuit comprising a current-conducting bar disposed to extend through the core members in inductive relation thereto to be energized by direct current for affecting the magnetization of the core members, a secondary circuit including a pair of alternating current windings disposed in reversely-wound relation on the respective core members to be energized by alternating current, the energization of the alternating current windings on the core members being controlled in response to the energization of the current-conducting bar, rectifying means connected in the secondary circuit for providing a source of unidirectional current, means disposed for filtering the unidirectional current, a control circuit connected to the rectifying means to be supplied with the unidirectional current in accordance with the energization of the primary circuit, the control circuit including a winding disposed in inductive relation to the core members in opposition to the inductive effect of the primary circuit for effecting the reduction of the magnetization of the core members to thereby limit the amount of alternating current in the secondary circuit, and means disposed in the control circuit for providing a measurement of the direct current in the primary circuit.

THEODORE R. SPECHT.

REFERENCES CITED

The following references are of record in the file of this patent:

FOREIGN PATENTS

| Number | Country | Date |
|--------|---------|------|
| 58,565 | Holland | Dec. 16, 1946 |